Oct. 3, 1961 R. M. BRUMBAUGH ET AL 3,002,671

MAGNETIC TAPE APPARATUS

Filed Oct. 22, 1958 4 Sheets-Sheet 1

INVENTORS
Robert M. Brumbaugh
Walter J. Cheney
BY
Flehr and Swain
ATTORNEYS

Oct. 3, 1961 R. M. BRUMBAUGH ET AL 3,002,671

MAGNETIC TAPE APPARATUS

Filed Oct. 22, 1958 4 Sheets-Sheet 2

INVENTORS
Robert M. Brumbaugh
Walter J. Cheney
BY

ATTORNEYS

INVENTORS
Robert M. Brumbaugh
Walter J. Cheney
BY
Flehr and Swain
ATTORNEYS

Oct. 3, 1961 R. M. BRUMBAUGH ET AL 3,002,671

MAGNETIC TAPE APPARATUS

Filed Oct. 22, 1958 4 Sheets-Sheet 4

Robert M. Brumbaugh &
Walter J. Cheney
INVENTORS

United States Patent Office 3,002,671
Patented Oct. 3, 1961

3,002,671

MAGNETIC TAPE APPARATUS

Robert M. Brumbaugh, Menlo Park, and Walter J. Cheney, San Mateo, Calif., assignors to Ampex Corporation, Redwood City, Calif., a corporation of California Filed Oct. 22, 1958, Ser. No. 769,019
9 Claims. (Cl. 226—176)

This invention relates generally to tape driving apparatus such as may be incorporated in record and/or playback machines of the magnetic tape type.

In our copending application Serial No. 698,118, filed November 22, 1957, entitled, "Magnetic Tape Machines," of which this application is a continuation in part, we have shown a magnetic tape machine suitable for such applications as collators or computers, where it is desirable to drive a pliable record tape medium with precise rapid start and stop action. The machine in that instance employs reels upon which the magnetic tape is wound, the reels being driven by motors controlled in such a manner that the tape is reeled and unreeled to accommodate the rapid start and stop action. Also the machine in that instance is provided with means for maintaining constantly tensioned tape loops between the driving capstan and the reels. An important aspect of such machines is the manner in which the tape is engaged for driving or feeding the same at a desired speed, with rapid start and stop action. Assuming that one or more tape driving capstans are employed against which the tape is pressed by a pinch or clamping roller, the use of conventional spring means for maintaining a desired clamping pressure has certain disadvantages. Particularly, the clamping pressure may be such that appreciable slippage tends to occur, which introduces errors in the recording and/or playback operations. Also the use of conventional springs or like means for initiating and maintaining clamping pressure does not provide the positive and rapid clamping action desired. A further disadvantage is that when the clamping roller is moved away from the capstan, the tape may not be stopped with sufficient rapidity and accuracy as is desired.

In general it is an object of the present invention to provide improved driving apparatus or means for a machine of the above character, which is characterized by precise rapid start and stop operations.

Another object of the invention is to provide apparatus of the above character which does not rely upon the force of a spring or solenoid to maintain clamping pressure between the tape and the capstan.

Another object of the invention is to provide improved tape driving means which has provision for braking the tape against further movement, when the clamping roller is disengaged.

Another object of the invention is to provide a novel electromagnetic operator for moving the tape clamping roller between tape clamping and release positions.

Another object of the invention is to provide novel circuitry for operating the tape driving means.

Referring to the drawing.

Figure 1:
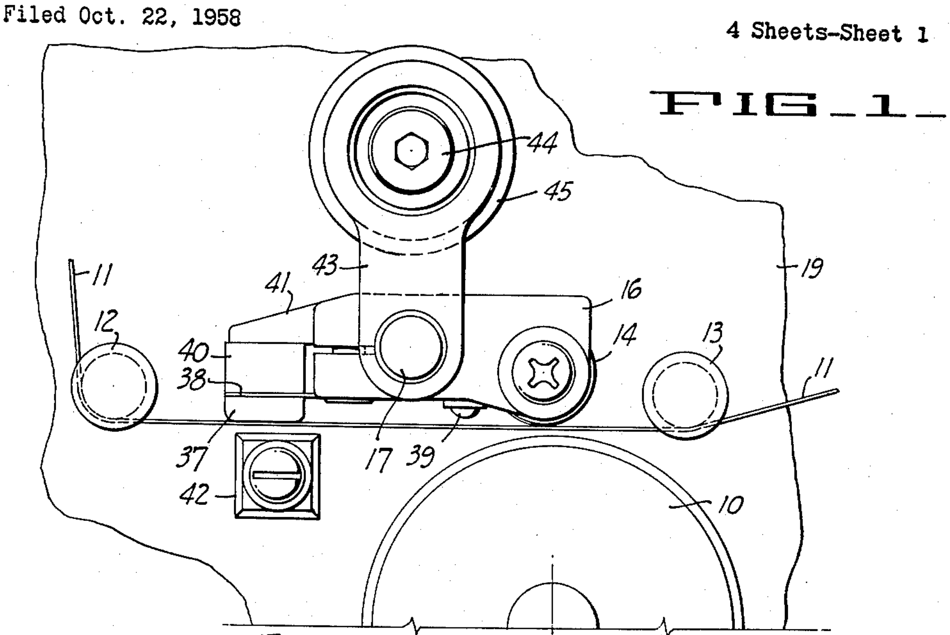
FIGURE 1 is a plan view illustrating tape driving means in accordance with the present invention.
Figure 2:
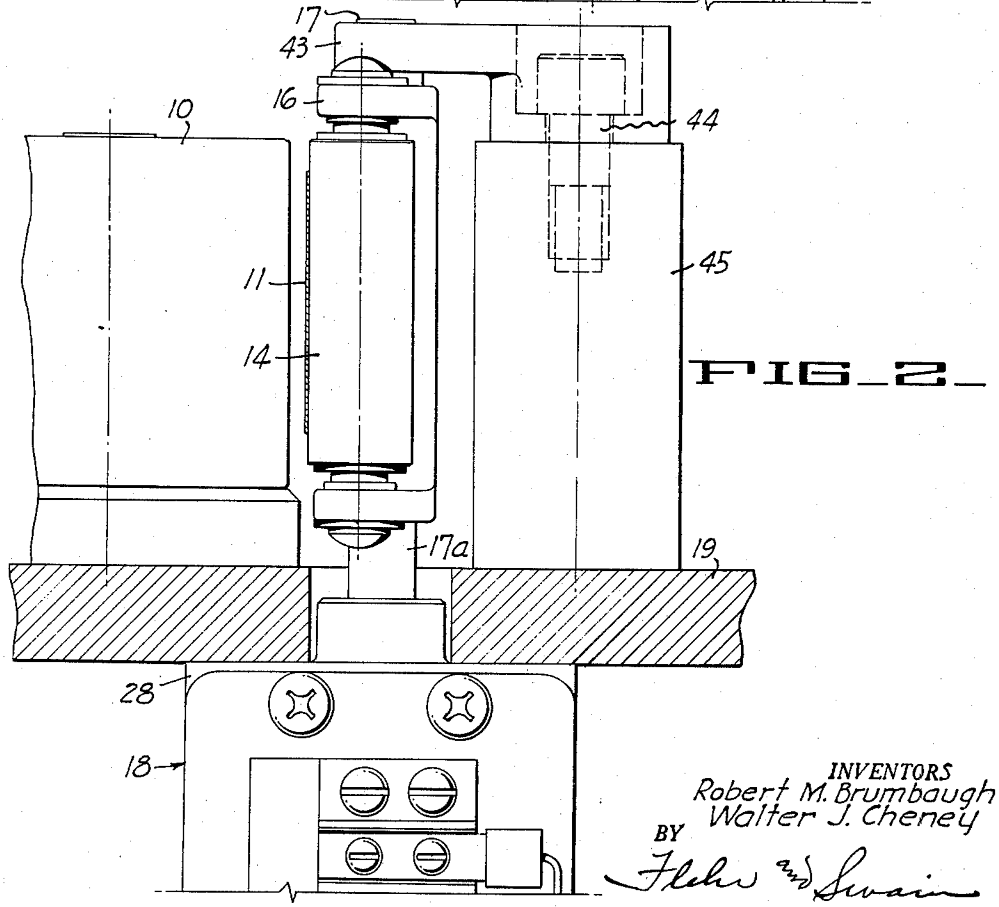
FIGURE 2 is a side view of the apparatus shown in FIGURE 1, with the mounting panel being in section.

The tape driving apparatus illustrated in FIGURES 1 and 2 consists of a capstan 10 adapted to be driven by suitable motive means (not shown). A portion 11 of magnetic tape is shown extending in proximity with the capstan periphery. The tape is shown engaging suitable guide means, such as the guide stud 12, and the flanged guide roller 13. A tape clamping or pinch roller 14 is carried by one free end of the arm 16, and this arm in turn is attached to the shaft 17. An electromagnetic operator 18 is directly connected to shaft 17, and may be disposed upon the rear side of the mounting panel 19.

Figure 3:
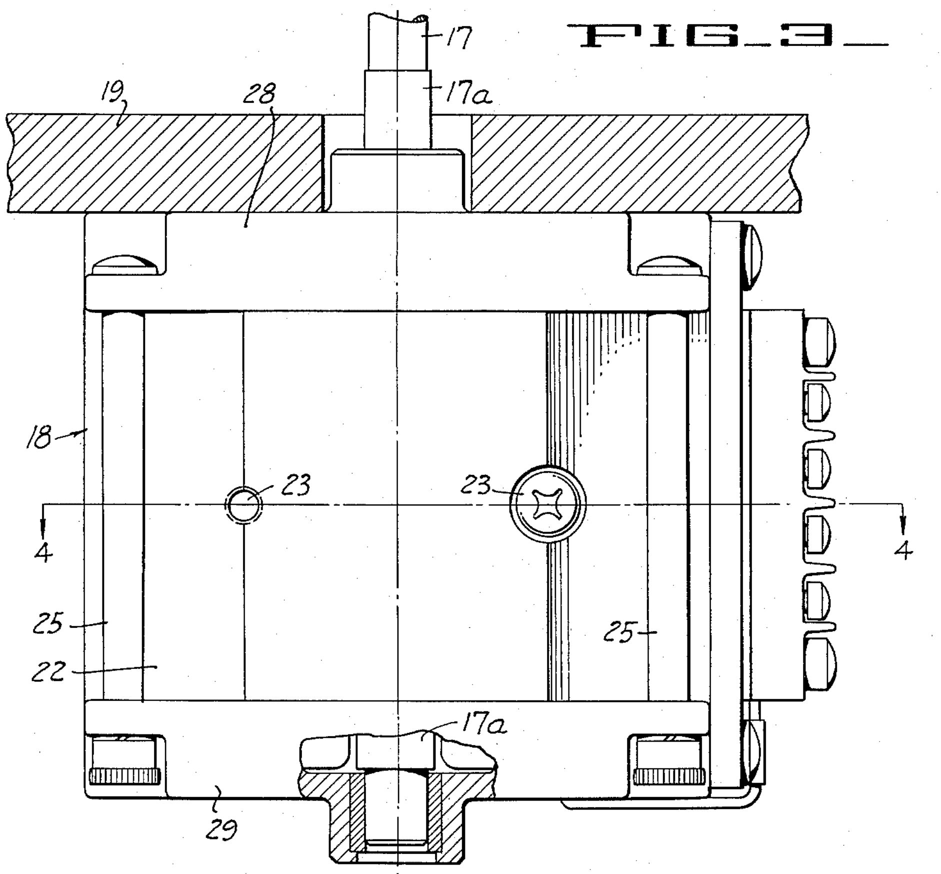
FIGURE 3 is a plan view of the electromagnetic operator for the clamping roller.
Figure 4:
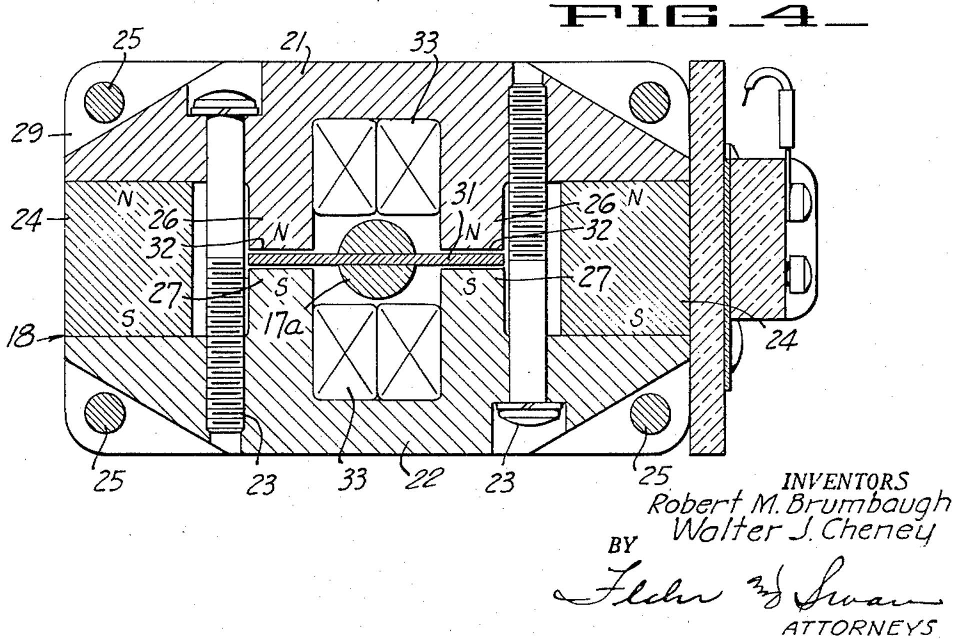
FIGURE 4 is a cross sectional view taken along the line 4—4 of FIGURE 3.
Figure 8:
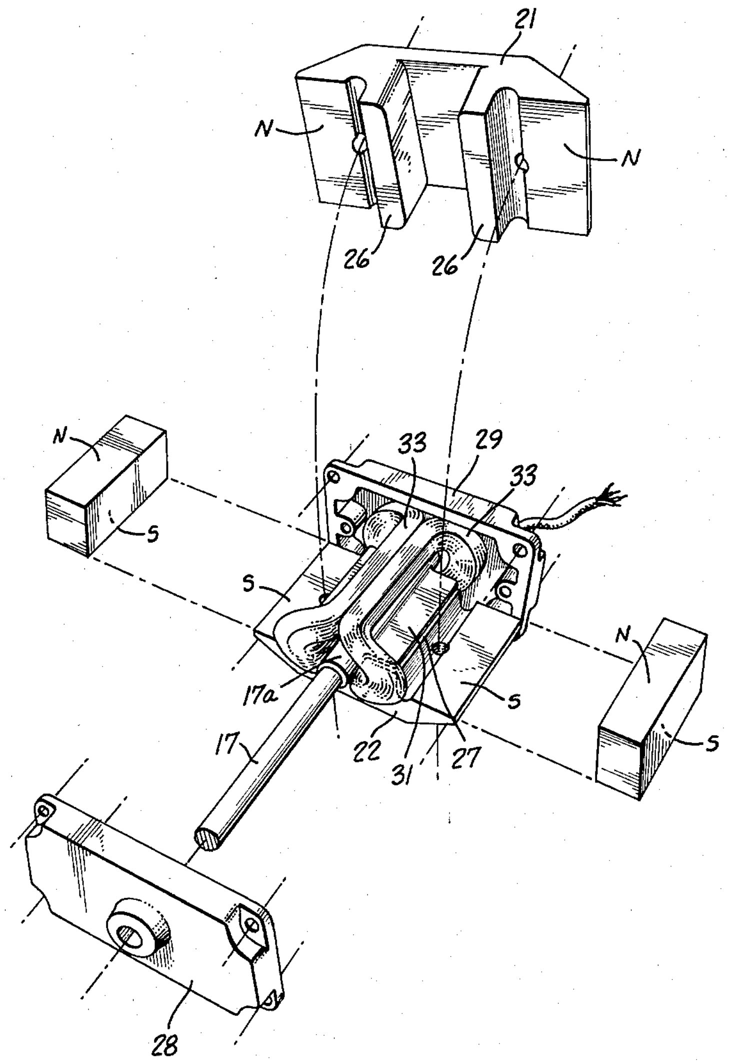
FIGURE 8 is an exploded perspective view illustrating the clamping device of this invention.

FIGURES 3, 4 and 8 show details of the electromagnetic operator. It consists of an electromagnet formed of two parts 21 and 22. These parts are clamped together by means of screws 23 and are flux coupled through the magnetic members 24 which also provide a desired physical spacing. The magnet parts 21 and 22 provide spaced poles 26 and 27, which are of opposite polarity. The operator shaft 17*a* is journaled in the end members 28 and 29 of the operator assembly, and carries a bar-like magnetic armature 31 which may be a flux passing ferrous bar for example. The ends of this armature extend within the gaps 32 between the poles. The dimensioning is such that the armature is permitted limited rocking movement between limiting positions defined by contact with the poles. It will be evident that magnetic flux passes through the armature 31, and that for the limiting positions of the armature just mentioned, flux passes from one or the other of the poles 26, to one or the other of the poles 27 of opposite polarity. Therefore, there is strong retention of the armature in the two limiting positions.

The two magnet parts 21 and 22 serve to house the separate operating coils or windings 33. As will be presently explained, suitable circuits connect with these windings whereby when the windings are pulsed, the resulting flux induced in the armature 31 causes it to be moved rapidly from one limiting position to the other.

Figure 5:
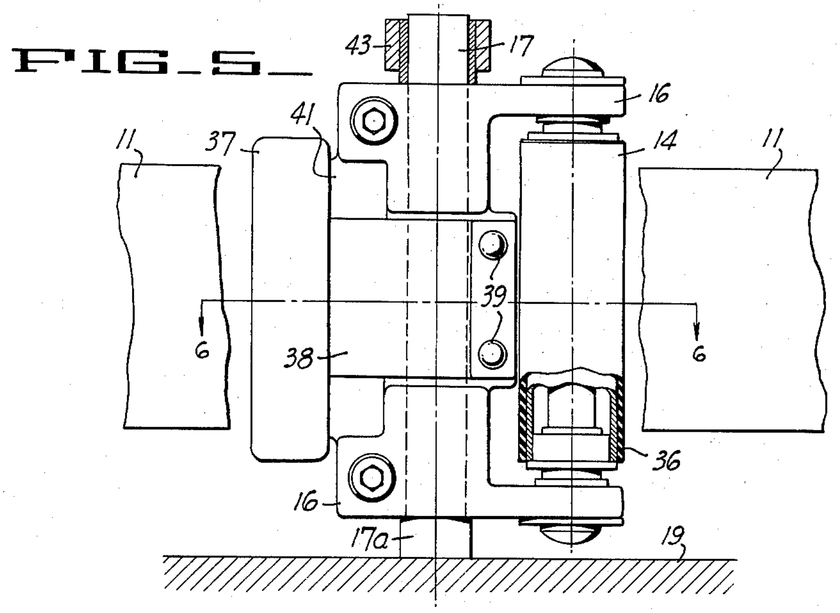
FIGURE 5 is a plan view of the clamping arm and roller.
Figure 6:
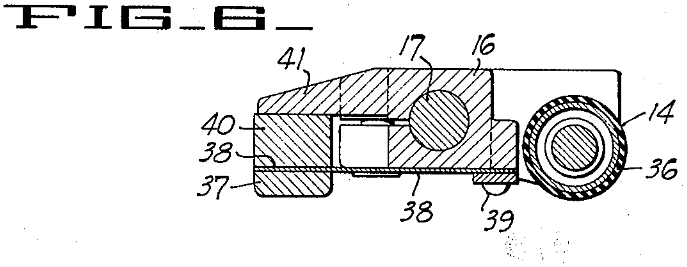
FIGURE 6 is a cross sectional view taken along the line 6—6 of FIGURE 5.

A desirable construction for the clamp arm 16 is shown in FIGURES 5 and 6. The arm in this instance is removably clamped upon the shaft 17, and one free end of the arm carries the pinch roller 14. As indicated, this roller may have a surfacing layer 36 of resilient material, such as suitable resilient natural or synthetic rubber. The other free end of the arm is provided with a brake shoe or pad 37, carried by the free end of the leaf spring 38. This leaf spring is suitably secured, as by means of screws or rivets 39, to the main body of the arm. The shoe 37 is weighted, as by providing the additional weighting member 40, to provide a desired amount of momentum. Movement of the shoe and the weight 40 in one direction is limited by the stop finger or pad 41, carried by the arm. Normally weight 40 is in contact with pad 41.

As shown particularly in FIGURE 1, in the complete assembly, the roller 14 and the shoe 37 are located upon one side of the tape. When the arm 16 is rocked in a clockwise direction, roller 14 is caused to contact and press the tape against the periphery of the driving capstan 10. The arm 16 is now in a position corresponding to one limiting position of the magnetic armature 31. The magnetic retention applied to the armature by virtue of the electromagnet pole pieces 26, in effect provides the necessary predetermined clamping force between the roller 14 and the tape. Assuming that the arm 16 is rapidly rotated in a counter-clockwise direction to the other limiting position of the armature 31, the momentum of the shoe 37 and weight 40 causes the shoe to overthrow, with the result that the shoe presses against the tape and deflects the tape a limited amount. Adjacent the shoe 37, but on the opposite side of the tape, there is a fixed snubbing stud 42. The action just described causes the shoe momentarily to press the tape against the snubbing stud, with the result that the tape is momentarily braked to rapidly and accurately stop its further movement. Shaft 17 is shown with its outer end journaled in the support 43, which in turn is secured by bolt 44 to the fixed support 45.

Figure 7:
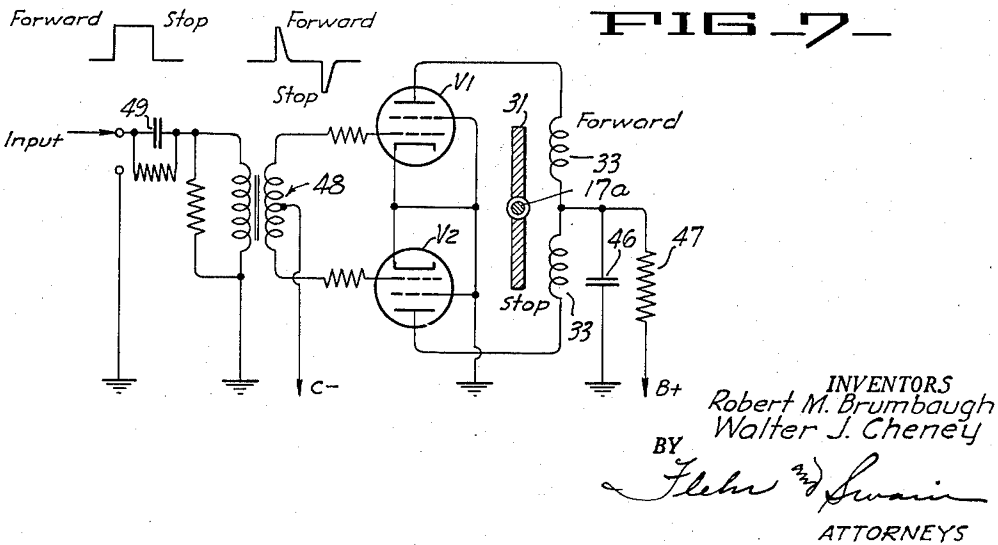
FIGURE 7 is a circuit diagram illustrating circuit means for energizing the electromagnetic operator.

FIGURE 7 illustrates suitable circuitry for energizing the windings 33 in response to applied controlling pulses. The plates of the thyratrons V1 and V2 are connected to terminals of the windings 33. These windings are connected together and to the grounded condenser 46, and also connected to a source of plate current through a resistor 47. The control grids of the two tubes are connected through resistors with the secondary terminals of a transformer 48. Controlling signals may be of square wave form as illustrated, and applied through coupling condensers 49, to the primary of the transformer 48. The length of the signal in this instance determines the time period during which the tape is driven. The wave form on the secondary terminals of transformer 48 will be substantially as indicated, or, in other words, will comprise a sharp pulse coincident with the beginning of the control signal, and a sharp pulse of opposite polarity coincident with the termination of the control signal. The control grids of tubes V1 and V2 are negatively biased as indicated whereby they are normally nonconducting. When a sharp positive pulse is applied to the control grid of tube V1, this tube is fired whereby current flow occurs from condenser 46 through the corresponding coil 33. Excitation of this coil causes the armature 31 to be moved to a position in which the pinch roller clamps the tape against the driving capstan. Upon termination of the sharp positive pulse, the armature 31 remains in the tape driving position. Decrease in current flow through condenser 46, following initial firing of V1, causes a self induced voltage to be developed across the corresponding winding 33, and this drives the voltage of the anode sufficiently low to restore tube V1 to the nonconducting state. When the second sharp pulse is applied to tubes V1 and V2, tube V2 is fired to energize the other winding 33, and as a result the armature 31 is returned to its tape release position whereby movement of the tape is arrested.

It will be evident that our invention accomplishes the objectives previously stated. Magnetic retention is relied upon for maintaining a desired tape clamping pressure. The rapid movement of the roller arm between tape clamping and release positions, coupled with the action of brake shoe 37, makes for rapid and precise start and stop action.

We claim:

1. In a machine of the character described, a rotatable tape driving capstan, means for guiding a pliable record tape whereby the tape passes in proximity with the periphery of the capstan, a roller for engaging and clamping the tape into driving relation with the driving capstan, a movable arm, the roller being carried by one free end of the arm, said arm being movable between two positions in one of which the roller is clamped against the tape and in the second of which the roller is retracted from the tape, and electromagnetic means for rapidly moving the arm between said limiting positions, said means including a member of the permanent magnet type for magnetically holding the arm in said first limiting position.

2. In a machine of the character described, a rotatable tape driving capstan, means for guiding a tape whereby the tape passes in proximity with the periphery of the capstan, a roller for engaging and clamping the tape into driving relation with the driving capstan, a rotatable shaft, a movable arm carried by the shaft, the roller being carried by one free end of said arm, said arm being movable between two positions, in one of which the roller is clamped against the tape, and in the second of which the roller is retracted from the tape, and electromagnetic means for rapidly moving the arm between said limiting positions, said electromagnetic means including windings for turning the shaft between said two limiting positions, and means forming a permanent magnetic field for magnetically retaining the arm in each of said limiting positions.

3. Apparatus as in claim 2 in which said electromagnetic means comprises a magnetic armature movable with said shaft, permanent magnet means for magnetically retaining said armature in either one of two positions corresponding to the two limiting positions of the arm, and windings inductively associated with a flux path that includes the armature, said windings when energized causing rotation of the armature in one direction or the other.

4. Apparatus as in claim 3 together with electronic circuit means for applying pulses to the windings.

5. In a magnetic tape machine, a rotatable tape driving capstan, means for guiding a pliable magnetic tape to pass in proximity with the periphery of the capstan, a roller for engaging and clamping the tape into driving engagement with the capstan, a rocker arm having said roller mounted upon one free end, said arm being movable between two positions, in one of which the roller clamps the tape against the capstan, and in the other of which the roller is retracted and disengaged with respect to the tape, and additional means coupled to the other free end of said arm responsive to movement of said arm to said second limiting position to momentarily brake movement of the tape.

6. Apparatus as in claim 5 in which said last named means comprises a weighted braking member for frictionally engaging the tape, yieldable means for mounting said braking member upon said arm, and a stationary snubbing member, the tape being disposed to pass between said snubbing member and said braking member, the momentum of said braking member when said arm is moved to said second position, causing the same to momentarily press against the tape.

7. In apparatus of the character described, an input circuit for receiving a current pulse of predetermined duration, means for deriving first and second time spaced pulses of opposite polarity from said input pulse, said pulses being coincident with the beginning and the end of the input pulse, a tape clamping roller, a tape driving capstan, said roller being movable between two positions, in one of which the roller is clamped toward said capstan and in the second of which the roller is retracted from the capstan, and electronic means responsive to said first and second pulses for sequentially moving the roller between clamped and retracted positions relative to the capstan.

8. In a magnetic tape machine, a tape driving capstan adapted to be rotated, means for guiding a pliable magnetic tape to pass in proximity with the periphery of the capstan, a roller for engaging and clamping the tape in driving engagement with the capstan, a movable arm having said roller mounted upon a free end, said arm being movable between two positions, in one of which the roller clamps the tape against the capstan, and in the other of which the roller is retracted and disengaged with respect to the tape, additional means coupled to another free end of said arm responsive to movement of said arm to said second limiting position to momentarily brake movement of the tape, and electromagnetic means for rapidly moving the arm between said limiting positions, said means including a member of the permanent magnet type for magnetically holding the arm in either of said positions.

9. In a machine of the character described, a rotatable tape driving capstan, means for guiding the tape whereby the tape passes in proximity with the periphery of the capstan, a roller for engaging and clamping the tape into driving relation with the capstan, a rotatable shaft, a movable arm carried by the shaft, said roller carried by a free end of said arm, said arm being movable between two positions, in one of which the roller is clamped against the tape, and in the second of which the roller is retracted from the tape, additional means coupled to another free end of said arm responsive to movement of said arm to said second limiting position to momentarily brake movement of the tape, an electromagnetic means for rapidly moving the arm between said limiting positions, said electromagnetic means including windings for turning the shaft between said two limiting positions, and means forming a permanent magnetic field for magnetically retaining the arm in each of said limiting positions.

References Cited in the file of this patent

UNITED STATES PATENTS

| | | |
|---|---|---|
| 2,321,618 | Potts | June 15, 1943 |
| 2,617,864 | Johnson | Nov. 11, 1952 |
| 2,745,604 | Masterson | May 15, 1956 |
| 2,838,250 | Stavrakis et al. | June 10, 1958 |
| 2,877,012 | Angel et al. | Mar. 10, 1959 |
| 2,924,757 | Schaeve | Feb. 9, 1960 |